United States Patent
Ozawa et al.

(10) Patent No.: US 10,288,883 B2
(45) Date of Patent: May 14, 2019

(54) HEAD-MOUNTED DISPLAY

(71) Applicant: KYOCERA Corporation, Kyoto-shi, Kyoto (JP)

(72) Inventors: Susumu Ozawa, Ebina (JP); Keisuke Okada, Yokohama (JP); Kouichirou Fujihara, Yokohama (JP); Yoshiteru Kurosaki, Yokohama (JP); Tomohiro Degawa, Tokyo (JP); Jun Matsuzawa, Kawasaki (JP); Shingo Ito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/469,845

(22) Filed: Mar. 27, 2017

(65) Prior Publication Data

US 2017/0276950 A1 Sep. 28, 2017

(30) Foreign Application Priority Data

Mar. 28, 2016 (JP) .................. 2016-064378
Mar. 28, 2016 (JP) .................. 2016-064384

(51) Int. Cl.
| G09G 5/00 | (2006.01) |
| G02B 27/01 | (2006.01) |
| G02C 11/00 | (2006.01) |
| G06F 3/06 | (2006.01) |
| G09G 3/00 | (2006.01) |
| G09G 3/30 | (2006.01) |
| G09G 3/36 | (2006.01) |
| H04W 4/00 | (2018.01) |

(52) U.S. Cl.
CPC ....... G02B 27/0172 (2013.01); G02B 27/017 (2013.01); G02B 27/0176 (2013.01); G02C 11/10 (2013.01); G06F 3/06 (2013.01); G09G 3/001 (2013.01); G09G 3/002 (2013.01); G09G 3/30 (2013.01); G09G 3/36 (2013.01); H04W 4/00 (2013.01); *G02B 27/01* (2013.01); *G02B 2027/0178* (2013.01)

(58) Field of Classification Search
CPC .. G02B 27/01; G02B 27/017; G02B 27/0176; G02B 2027/0178; G02C 11/10; G06F 1/163; G06F 1/1632; G06F 1/1675; G06F 3/011; G06F 3/038; G06F 3/06; G09G 3/00; G09G 3/30; G09G 3/36; G09G 5/00; H04W 4/00
See application file for complete search history.

(56) References Cited

U.S. PATENT DOCUMENTS 5,683,297 A * 11/1997 Raviv ............... A63F 13/02
 273/DIG. 17
8,854,282 B1 * 10/2014 Wong ................. G06F 3/14
 345/7

(Continued)

FOREIGN PATENT DOCUMENTS

JP 2012-231259 A 11/2012

*Primary Examiner* — Joe H Cheng
(74) *Attorney, Agent, or Firm* — Hauptman Ham, LLP

(57) ABSTRACT

In one aspect, a head-mounted display includes displays, a front portion formed in such a manner as to surround at least a part of peripheral portions of the displays, and at least one temple portion connected to the front portion. An interface capable of connecting a cartridge thereto is provided in the at least one temple portion.

4 Claims, 12 Drawing Sheets

(56) References Cited

U.S. PATENT DOCUMENTS

| | | | |
|---|---|---|---|
| 2002/0070883 A1* | 6/2002 | Dosch | G06F 1/1626 341/22 |
| 2012/0268433 A1 | 10/2012 | Horii et al. | |
| 2013/0021374 A1* | 1/2013 | Miao | G06F 3/011 345/633 |
| 2013/0083003 A1* | 4/2013 | Perez | G06F 3/005 345/419 |
| 2014/0016800 A1* | 1/2014 | Dong | G02B 27/02 381/151 |
| 2014/0168266 A1* | 6/2014 | Kimura | G02B 27/0172 345/633 |
| 2016/0049012 A1* | 2/2016 | Torii | G06T 19/006 345/633 |
| 2016/0063767 A1* | 3/2016 | Lee | G06T 19/006 345/419 |
| 2016/0066295 A1* | 3/2016 | Han | G06F 3/013 345/8 |
| 2016/0344882 A1* | 11/2016 | Tsujioka | G06F 3/011 |
| 2017/0227779 A1* | 8/2017 | Kato | G02B 27/02 |
| 2017/0276941 A1* | 9/2017 | Fujihara | G02B 27/017 |
| 2017/0276949 A1* | 9/2017 | Okada | G09G 3/36 |
| 2017/0277221 A1* | 9/2017 | Degawa | G06F 1/163 |
| 2017/0277222 A1* | 9/2017 | Matsuzawa | G06F 1/163 |
| 2017/0277223 A1* | 9/2017 | Matsuzawa | G06F 1/1632 |
| 2017/0278453 A1* | 9/2017 | Kurosaki | G09G 3/2096 |

* cited by examiner

HEAD-MOUNTED DISPLAY

CROSS-REFERENCE TO RELATED APPLICATION(S)

The present application claims priority to and incorporates by reference the entire contents of Japanese Patent Application No. 2016-064378 filed in Japan on Mar. 28, 2016 and Japanese Patent Application No. 2016-064384 filed in Japan on Mar. 28, 2016.

1. FIELD

The present application relates to a head-mounted display.

2. BACKGROUND

Conventionally, there has been a display device to be worn on the head.

SUMMARY

A head-mounted display according to one aspect includes displays, a front portion formed in such a manner as to surround at least a part of peripheral portions of the displays, and at least one temple portion connected to the front portion. An interface capable of connecting a cartridge thereto is provided in the at least one temple portion.

A head-mounted display according to another aspect includes displays, a front portion formed in such a manner as to surround at least a part of peripheral portions of the displays, and a temple portion connected to the front portion. An interface capable of connecting a cartridge thereto is provided in the front portion, and the interface includes an opening that is open in an area in the front portion, the area facing a face of a user, when the head-mounted display is being worn by the user of the head-mounted display.

A head-mounted display according to another aspect includes a first power accumulator that supplies power to the head-mounted display, an interface capable of connecting a cartridge thereto, and a controller that performs control so that when the cartridge is connected to the interface, power supply is received not from the first power accumulator, but from a second power accumulator included in the cartridge.

The above and other objects, features, advantages and technical and industrial significance of this invention will be better understood by reading the following detailed description of presently preferred embodiments of the invention, when considered in connection with the accompanying drawings.

DETAILED DESCRIPTION

Further improved usability is desired for the display device described above. Embodiments of a head-mounted display according to the present application will be described in detail with reference to the drawings. A user of the head-mounted display according to the present application can receive various services via the head-mounted display, for example, by connecting a cartridge to the head-mounted display and causing the head-mounted display to read particular content from the cartridge. Cartridges which can be connected to the head-mounted display may be provided from various facilities capable of providing services via the head-mounted display, irrespective of whether such facilities are outdoor or indoor facilities. Examples of the facilities include business parks, shopping centers, fashion buildings, parks, amusement facilities, high-tech parks, and residential facilities.

Figure 1:
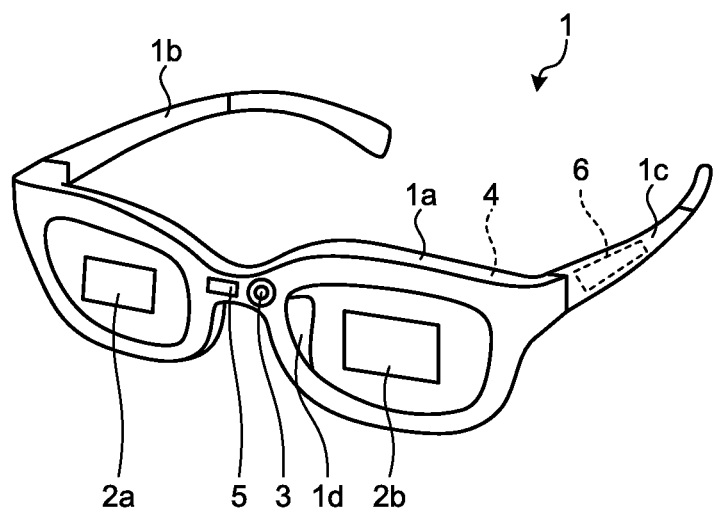
FIG. 1 is a view illustrating a schematic configuration of an appearance of a head-mounted display according to embodiments.

FIG. 1 is a view illustrating a schematic configuration of an appearance of the head-mounted display according to embodiments. As illustrated in FIG. 1, a head-mounted display 1 has a spectacles-shape and includes a front portion 1a, temple portions 1b and 1c, and support portions 1d. The temple portion 1b is an example of a first temple portion, for example. The temple portion 1c is an example of a second temple portion, for example. The shape of the head-mounted display 1 illustrated in FIG. 1 is by way of example only. There is no limitation to the shape illustrated in FIG. 1 as long as a function as a wearable device to be worn on the head can be realized.

The front portion 1a is formed in such a manner as to surround at least a part of peripheral portions of displays 2a and 2b. The front portion 1a is a portion arranged before the eyes of a user of the head-mounted display 1 when the user wears the head-mounted display 1. The support portions 1d are in a pair (not illustrated) and contact the nose of the user of the head-mounted display 1 in such a manner as to sandwich the nose therebetween when the user wears the head-mounted display 1. When the user wears the head-mounted display 1, the support portions 1d make a contribution towards supporting the head-mounted display 1 in such a manner that the head-mounted display 1 is prevented from slipping down on the face of the user in a gravitational direction, and an attitude of the head-mounted display 1 being worn is maintained as far as possible.

The front portion 1a also includes imagers 3 and 4, a detector 5, and an operation unit 6.

The temple portions 1b and 1c are formed in a similar rod-like shape. The temple portions 1b and 1c are portions respectively arranged along the temporal regions of the user of the head-mounted display 1 when the user wears the head-mounted display 1. One end portion of the temple portion 1b and one end portion of the temple portion 1c are parts foldably connected to the front portion 1a via a hinge (not illustrated), respectively. Another end portion of the temple portion 1b and another end portion of the temple portion 1c are parts respectively applied to the ears of the user of the head-mounted display 1 when the user wears the head-mounted display 1. As with the support portions 1d, when the user wears the head-mounted display 1, the temple portions 1b and 1c make a contribution towards supporting the head-mounted display 1 in such a manner that the head-mounted display 1 is prevented from slipping down on the face of the user in the gravitational direction, and the attitude of the head-mounted display 1 being worn is maintained as far as possible.

Figure 2:
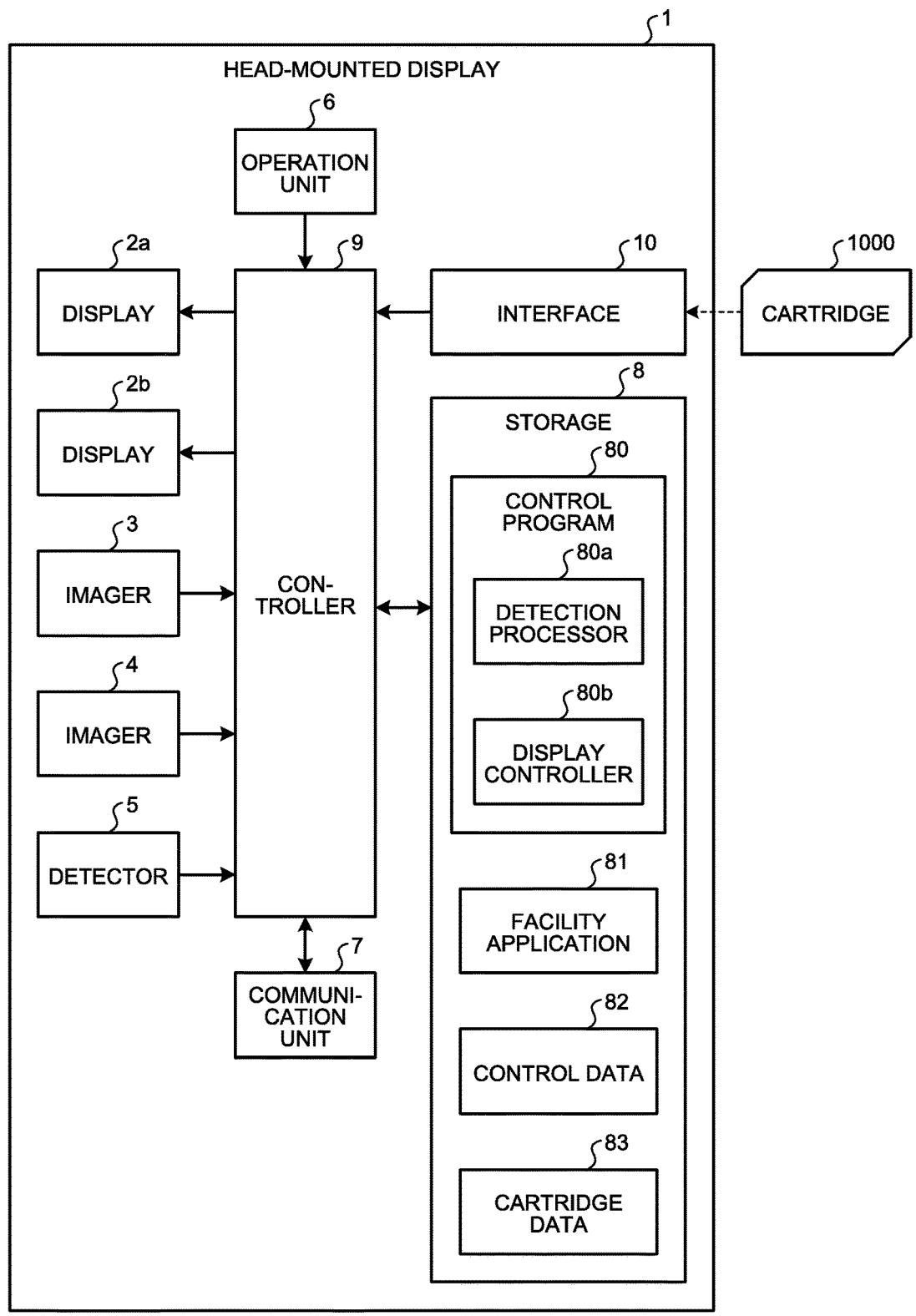
FIG. 2 is a block diagram illustrating an example of a functional configuration of the head-mounted display according to some embodiments.

FIG. 2 is a block diagram illustrating an example of the functional configuration of the head-mounted display according to some embodiments.

As illustrated in FIG. 2, the head-mounted display 1 is configured to include the displays 2a and 2b, the imagers 3 and 4, the detector 5, the operation unit 6, a communication unit 7, a storage 8, a controller 9, and an interface 10.

The displays 2a and 2b may include a transflective or transmissive display device such as a liquid crystal display or an organic electro-luminescence (EL) panel. The displays 2a and 2b display various kinds of information in accordance with a control signal input from the controller 9. The displays 2a and 2b may be a projector which projects an image on the retina of the user with a light source of, for example, laser light.

The imagers 3 and 4 electronically pick up an image by using an image sensor such as a charge coupled device image sensor (CCD) or a complementary metal oxide semiconductor (CMOS). The imagers 3 and 4 convert the picked-up image into a signal, and output the signal to the controller 9. The imager 3 is an out-camera which picks up an image of the foreground of the user wearing the head-mounted display 1, for example. The imager 4 is an in-camera which picks up an image of the user wearing the head-mounted display 1, for example.

The detector 5 executes various kinds of detection. The detector 5 is capable of detecting an object to be detected, a change in a state of the object to be detected, and the like, by using at least one of visible light, infrared light, ultraviolet light, a radio wave, a sonic wave, magnetism, and capacitance. Examples of the object to be detected include a stationary object, a moving object, a living organism, and a non-living material.

The operation unit 6 receives from the user an operation input, for example, for starting up or shutting down the head-mounted display 1, and changing various settings including an operation setting thereof. The operation unit 6 converts the operation input received from the user into a signal, and outputs the signal to the controller 9.

The communication unit 7 is capable of communicating with other devices. The communication unit 7 is capable of transmitting and receiving various kinds of information exchanged with other head-mounted displays, facility servers disposed in the facilities, or the like, using a predetermined communication protocol, for example. The communication unit 7 is capable of communicatively connecting to other head-mounted displays. The communication unit 7 is capable of supporting one or more of short range wireless communication standards. Examples of the short range wireless communication standard include IEEE802.11, Bluetooth (registered trademark), Infrared Data Association (IrDA), Near Field Communication (NFC), and Wireless Personal Area Network (WPAN).

The storage 8 stores a program, data, and the like therein. The program stored in the storage 8 includes a control program 80. An application stored in the storage 8 includes a facility application 81. The data stored in the storage 8 includes control data 82 and cartridge data 83.

The storage 8 may be used as a work area for temporarily storing a processing result of the controller 9. The storage 8 may be configured by any non-transitory storage medium such as a semiconductor storage medium and a magnetic storage medium. The storage 8 may include a plurality of kinds of storage media. The storage 8 may include a combination of a storage medium such as a memory card, an optical disc, or a magneto-optical disk, and a reader of the storage medium. The storage 8 may include a storage device used as a temporary storage area such as a random access memory (RAM). The program stored in the storage 8 may include a program (not illustrated) which supports an operation of an application. The program stored in the storage 8 may be acquired from other devices such as a server through wireless or wired communication.

The control program 80 provides functions relating to various kinds of control of the head-mounted display 1. The functions provided by the control program 80 include a detection processor 80a and a display controller 80b.

The detection processor 80a provides a function to execute various kinds of control of the head-mounted display 1 based on a detection result of the detector 5. The display controller 80b provides a function to execute display control of the displays 2a and 2b.

The facility application 81 is, for example, an application which provides a function with which the user of the head-mounted display 1 uses installations and devices disposed in the facilities via the head-mounted display 1. For example, in a case of an amusement park, the facility application 81 falls under an application for displaying various kinds of information regarding the amusement park, for example, a map of the amusement park, or outputting a moving image, sound, and the like when the user enjoys various attractions arranged in the amusement park.

The control data 82 is data used for various kinds of control of the head-mounted display 1 executed by the function provided by the control program 80.

The cartridge data 83 is data acquired from a cartridge 1000 connected to the interface 10. For example, in a case of an amusement park, the cartridge data 83 is used in order for the facility application 81 to output a moving image, sound, and the like, to the head-mounted display 1 in accordance with a progression of a game in an attraction.

The controller 9 includes a processor. The processor may be configured to include, for example, a central processing unit (CPU), a system-on-a-chip (SoC), a micro control unit (MCU), a field-programmable gate array (FPGA), and a coprocessor, but there is no limitation to the case where the processor is configured to include the above devices. The controller 9 integrally controls operations of the head-mounted display 1 to realize various functions. Specifically, the controller 9 realizes various kinds of control of the head-mounted display 1 by executing a command included in the control program 80 stored in the storage 8 while referring to the control data 82 stored in the storage 8 if needed.

The interface 10 is open in such a manner that the interface 10 can receive and be connected to the cartridge 1000 inserted therein. When the cartridge 1000 is connected, the interface 10 outputs a connection detection signal to the controller 9. The connection detection signal is used for notifying the controller 9 that the cartridge 1000 has been connected. The interface 10 acquires, from the cartridge 1000 thus connected, data stored in the cartridge 1000, and outputs the acquired data to the controller 9.

Figure 3:
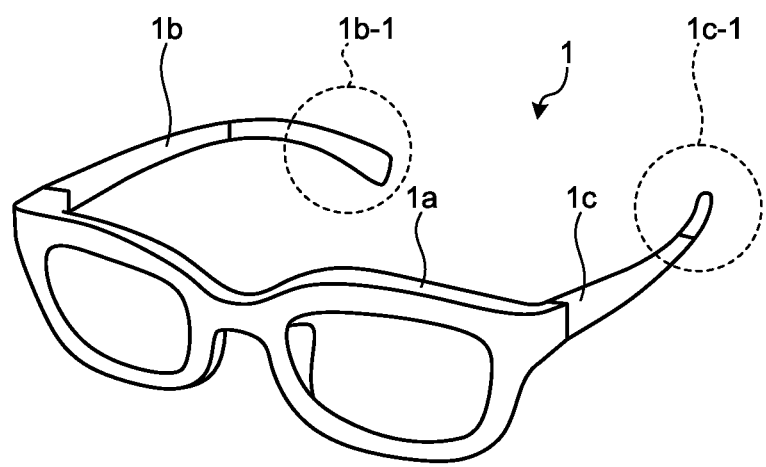
FIG. 3 is a view illustrating an example of a mounting position of an interface according to some embodiments.
Figure 4:
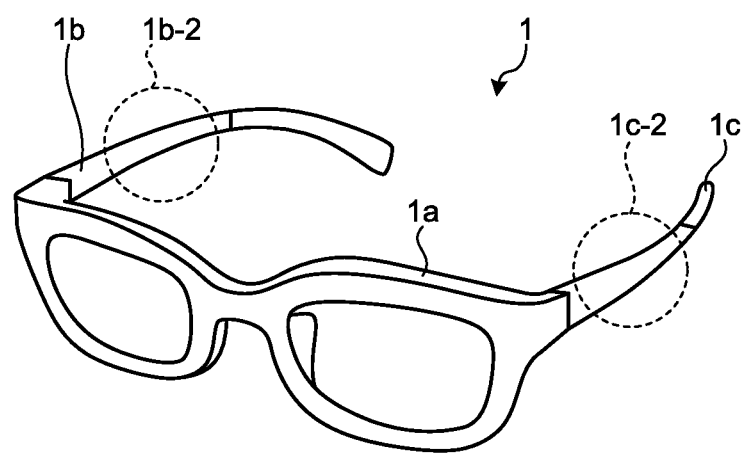
FIG. 4 is a view illustrating an example of the mounting position of the interface according to some embodiments.
Figure 5:
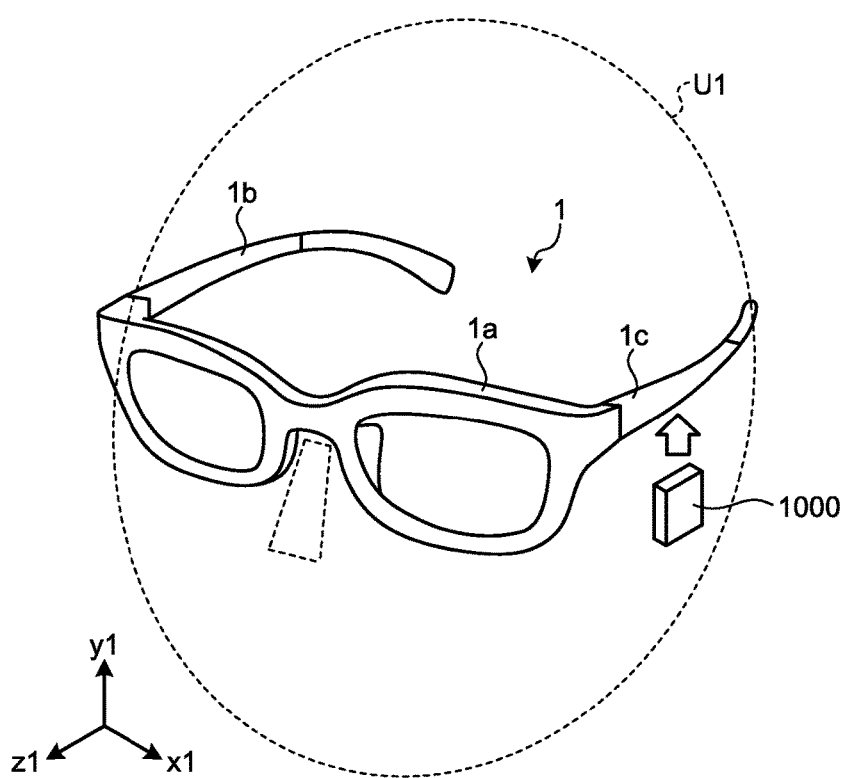
FIG. 5 is a view illustrating an example of an opening direction of the interface according to some embodiments.
Figure 6:
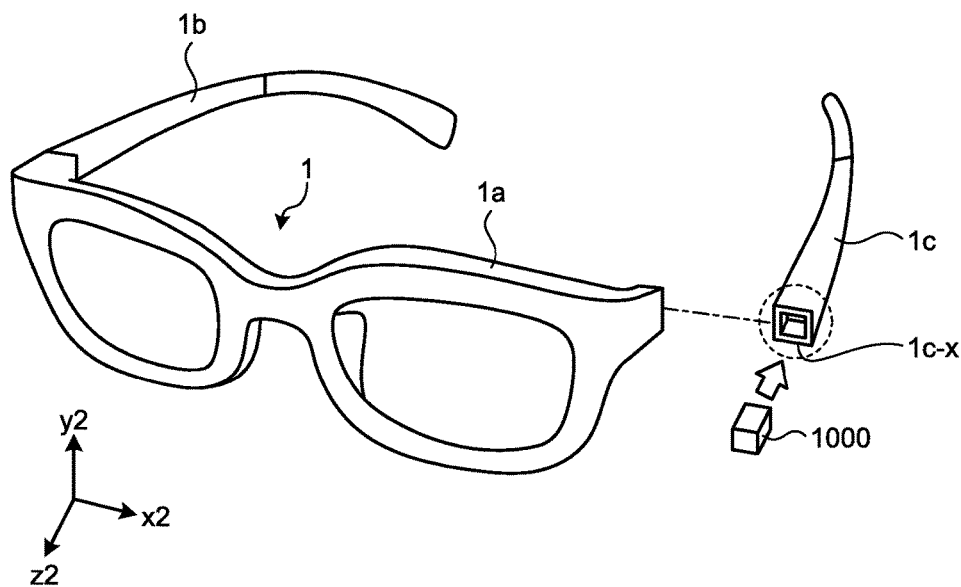
FIG. 6 is a view illustrating other examples of the mounting position and the opening direction of the interface according to some embodiments.
Figure 7:
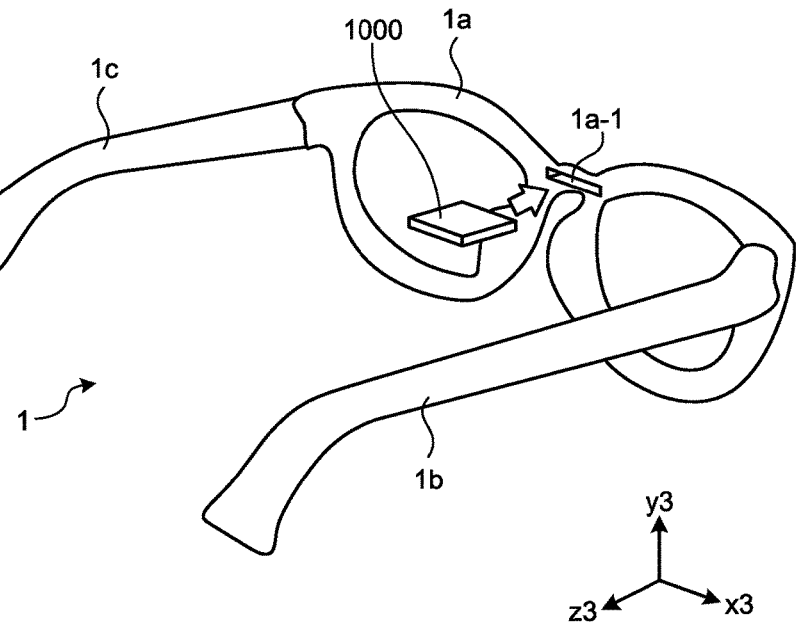
FIG. 7 is a view illustrating other examples of the mounting position and the opening direction of the interface according to some embodiments.

Hereinbelow, regarding the interface included in the head-mounted display, examples of a mounting position, and an opening direction of the opening will be described by using FIGS. 3 to 7. FIGS. 3 and 4 are views illustrating the examples of the mounting position of the interface according to some embodiments. FIG. 5 is a view illustrating an example of the opening direction of the interface according to some embodiments. FIGS. 6 and 7 are views illustrating other examples of the mounting position and the opening direction of the interface according to some embodiments.

As illustrated in FIG. 3, the interfaces 10 can be mounted in the head-mounted display 1, in a near-end portion 1*b*-1 and a near-end portion 1*c*-1, respectively. The near-end portion 1*b*-1 is a portion at which one of the end portions of the temple portion 1*b* is not connected to the front portion 1*a*. The near-end portion 1*c*-1 is a portion at which one of the end portions of the temple portion 1*c* is not connected to the front portion 1*a*. Alternatively, as illustrated in FIG. 4, the interfaces 10 can be mounted in the head-mounted display 1, in a near-center portion 1*b*-2 of the temple portion 1*b* and a near-center portion 1*c*-2 of the temple portion 1*c*, respectively. Regarding the head-mounted display 1, for example, in a case where the front portion 1*a* includes the imagers 3 and 4, the detector 5, the operation unit 6, and the like and thus it is heavier than the temple portions 1*b* and 1*c*, it is possible to make the weight of the temple portion 1*b* (or the temple portion 1*c*) approximate to the weight of the front portion 1*a* by connecting the cartridge 1000 to the temple portion 1*b* (or the temple portion 1*c*). As a result, it is possible to achieve the head-mounted display 1 more comfortably worn.

In a case where the interfaces 10 are mounted in the temple portions 1*b* and 1*c*, each interface 10 is open downward in a vertical direction when the head-mounted display 1 is being worn by a user U1 (see FIG. 5) of the head-mounted display 1. With the above configuration, in the head-mounted display 1, it is possible to prevent dust and the like from entering the opening (a portion open toward outside) included in each interface 10.

The direction in which the interface 10 is open will be described by using FIG. 5. An x1-axis, a y1-axis, and a z1-axis of coordinate axes illustrated in FIG. 5 are assumed to be perpendicular to one another. In the example illustrated in FIG. 5, a longitudinal direction of the front portion 1*a* of the head-mounted display 1 is assumed to be coincide with a direction in parallel with a direction of the x1-axis of the coordinate axes illustrated in FIG. 5. The interface 10 is open in a direction where the cartridge 1000 can be inserted in and connected to the head-mounted display 1. In the example illustrated in FIG. 5, although it is not explicitly illustrated in the figure, the interface 10 is open, for example, in a direction downward in a vertical direction, in other words, in a direction in parallel with a negative direction of the y1-axis.

In the head-mounted display 1, as illustrated in FIGS. 3 and 4, the interfaces 10 may be respectively mounted in the temple portions 1*b* and 1*c*, or the interface 10 may be mounted in either one of the temple portions 1*b* and 1*c*. In a case where the interfaces 10 are respectively mounted in the temple portions 1*b* and 1*c*, the interface 10 mounted in the temple portion 1*b* is an example of a first interface, and the interface 10 mounted in the temple portion 1*c* is an example of a second interface.

Other examples of the mounting position and the opening direction of the interface will be described by using FIG. 6. An x2-axis, a y2-axis, and a z2-axis of coordinate axes illustrated in FIG. 6 are assumed to be perpendicular to one another. In the example illustrated in FIG. 6, a longitudinal direction of the front portion 1*a* of the head-mounted display 1 is assumed to be coincide with a direction in parallel with a direction of the x2-axis of the coordinate axes illustrated in FIG. 6. As illustrated in FIG. 6, in the head-mounted display 1, the interface 10 can be mounted also in an abutment portion 1*c*-*x* of the temple portion 1*c*, which is a position where the temple portion 1*c* contacts the front portion 1*a* when the temple portion 1*c* is completely opened. The interface 10 is open in such a manner that the cartridge 1000 can be inserted therein and connected thereto. In the example illustrated in FIG. 6, the interface 10 is illustrated which is open in a direction in parallel with a positive direction of the z2-axis of the coordinate axes illustrated in FIG. 6. With the above configuration, in the head-mounted display 1, the opening of the interface 10 is closed by the front portion 1*a* when the temple portion 1*c* is completely opened, and as a result, it is possible to protect the cartridge 1000 against external impact and the like.

In the example illustrated in FIG. 6, the head-mounted display 1 may be defined to have an opening being open in a longitudinal direction of the temple portion 1*b* (or the temple portion 1*c*), in the temple portion 1*b* (or the temple portion 1*c*).

Other examples of the mounting position and the opening direction of the interface will be described by using FIG. 7. An x3-axis, a y3-axis, and a z3-axis of coordinate axes illustrated in FIG. 7 are assumed to be perpendicular to one another. In the example illustrated in FIG. 7, a longitudinal direction of the front portion 1*a* of the head-mounted display 1 is assumed to be coincide with a direction in parallel with a direction of the x3-axis of the coordinate axes illustrated in FIG. 7. As illustrated in FIG. 7, in the head-mounted display 1, the interface 10 can be mounted in an area 1*a*-1. The area 2*a*-1 is an area in the front portion 1*a*, and faces the face of the user. The interface 10 is open in such a manner that the cartridge 1000 can be inserted therein and connected thereto. In the example illustrated in FIG. 7, the interface 10 is illustrated which is open in a direction in parallel with a positive direction of the z3-axis of the coordinate axes illustrated in FIG. 7. With the above configuration, in the head-mounted display 1, it is possible to protect the cartridge 1000, which is connected to the interface 10, against external impact and the like.

Figure 8:
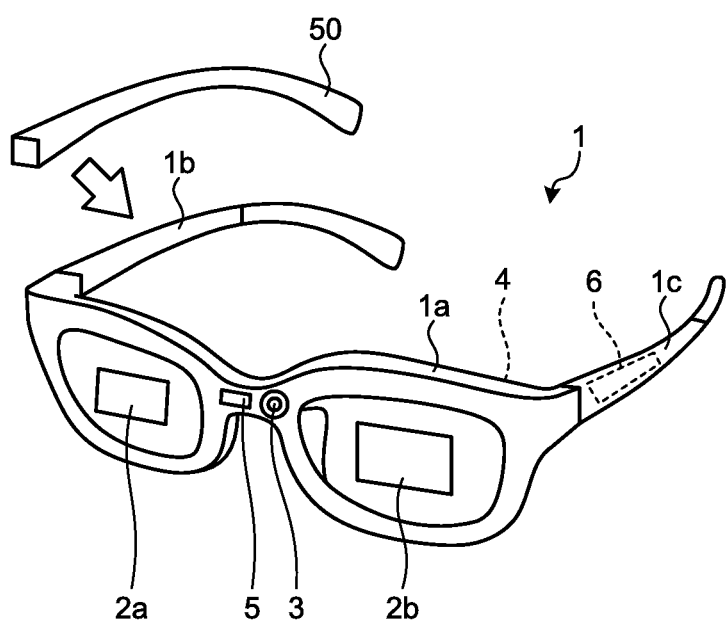
FIG. 8 is a view illustrating an example of a member to be attached to the head-mounted display according to some embodiments.

FIG. 8 is a view illustrating an example of a member to be attached to the head-mounted display according to some embodiments. As illustrated in FIG. 8, the head-mounted display 1 may have a configuration in which a cover member 50 can be attached to, for example, the temple portion 1*b*. The cover member 50 has a structure capable of covering, for example, the temple portion 1b completely. In a case of mounting the interface 10 in the temple portion 1b, the cover member 50 can prevent dust and the like from entering the opening included in the interface 10.

Figure 9:
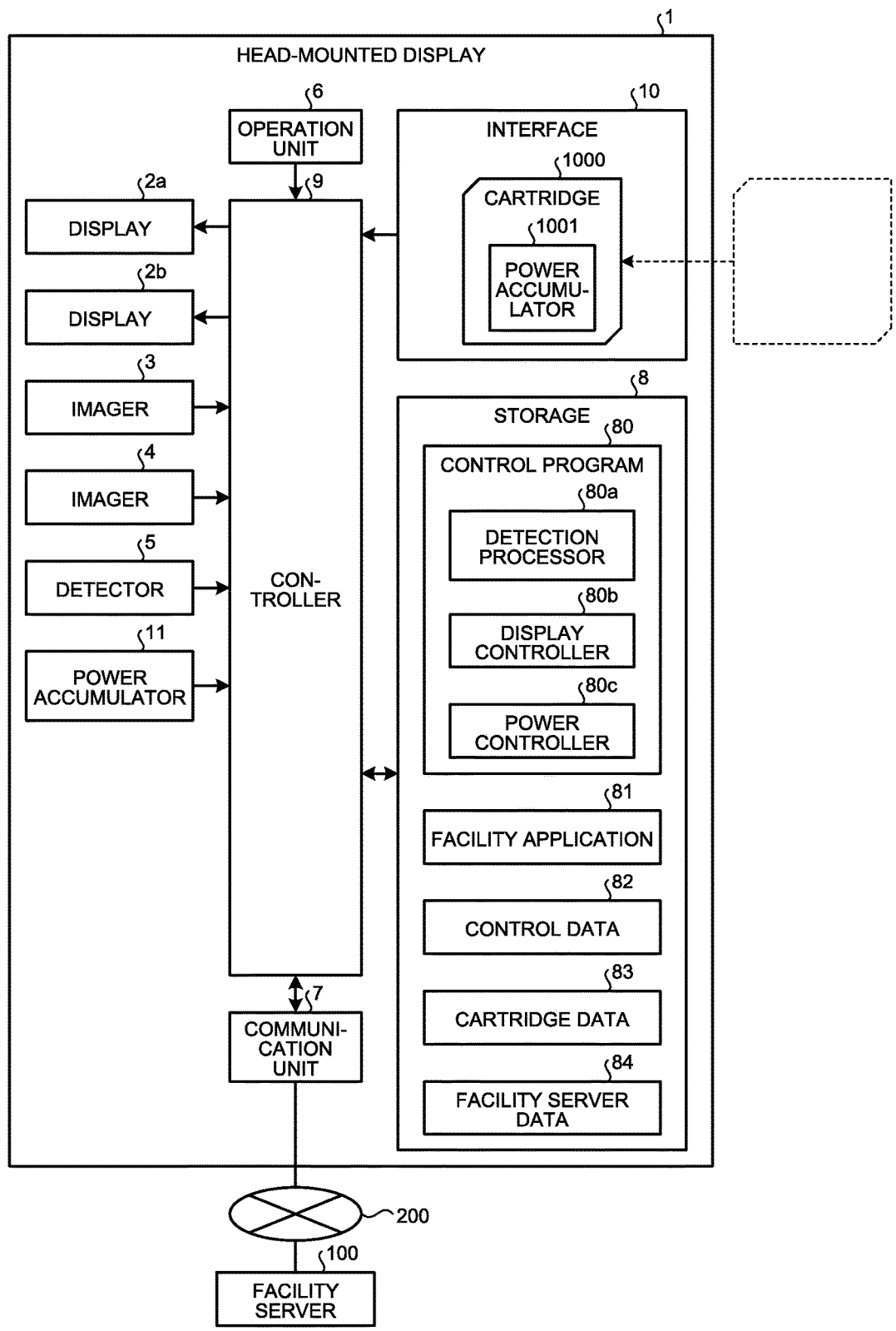
FIG. 9 is a block diagram illustrating an example of the functional configuration of the head-mounted display according to some embodiments.

FIG. 9 is a block diagram illustrating an example of the functional configuration of the head-mounted display according to some embodiments. As illustrated in FIG. 9, the head-mounted display 1 is configured to include the displays 2a and 2b, the imagers 3 and 4, the detector 5, the operation unit 6, the communication unit 7, the storage 8, the controller 9, the interface 10, and a power accumulator 11.

The displays 2a and 2b may include a transflective or transmissive display device such as a liquid crystal display or an organic electro-luminescence (EL) panel. The displays 2a and 2b display various kinds of information in accordance with a control signal input from the controller 9. The displays 2a and 2b may be a projection device which projects an image on the retina of the user with a light source of, for example, laser light.

The imagers 3 and 4 electronically pick up an image by using an image sensor such as a charge coupled device image sensor (CCD) or a complementary metal oxide semiconductor (CMOS). The imagers 3 and 4 convert the picked-up image into a signal, and output the signal to the controller 9. The imager 3 is an out-camera which picks up an image of the foreground of the user wearing the head-mounted display 1, for example. The imager 4 is an in-camera which picks up an image of the user wearing the head-mounted display 1, for example.

The detector 5 executes various kinds of detection. The detector 5 is capable of detecting an object to be detected, a change in a state of the object to be detected, and the like, by using at least one of visible light, infrared light, ultraviolet light, a radio wave, a sonic wave, magnetism, and capacitance. Examples of the object to be detected include a stationary object, a moving object, a living organism, and a non-living material. In some embodiments, the detector 5 can execute detection of information for determining whether the head-mounted display 1 is being worn by the user of the head-mounted display 1. The detector 5 outputs, to the controller 9, the information for determining whether the head-mounted display 1 is being worn by the user of the head-mounted display 1.

The operation unit 6 receives from the user an operation input, for example, for starting up or shutting down the head-mounted display 1, and changing various settings including an operation setting thereof. The operation unit 6 converts the operation input received from the user into a signal, and outputs the signal to the controller 9.

The communication unit 7 is capable of communicating with other devices. The communication unit 7 is capable of transmitting and receiving various kinds of information exchanged with a facility server 100 disposed in the facilities, or the like, via a communication network 200, using a predetermined communication protocol, for example. The communication unit 7 is capable of supporting one or more of short range wireless communication standards. Examples of the short range wireless communication standard include IEEE802.11, Bluetooth (registered trademark), Infrared Data Association (IrDA), Near Field Communication (NFC), and Wireless Personal Area Network (WPAN).

The storage 8 stores a program and data therein. The program stored in the storage 8 includes the control program 80. An application stored in the storage 8 includes the facility application 81. The data stored in the storage 8 includes the control data 82, the cartridge data 83, and facility server data 84.

The storage 8 may be used as a work area for temporarily storing a processing result of the controller 9. The storage 8 may be configured by any non-transitory storage medium such as a semiconductor storage medium and a magnetic storage medium. The storage 8 may include a plurality of kinds of storage media. The storage 8 may include a combination of a storage medium such as a memory card, an optical disc, or a magneto-optical disk, and a reader of the storage medium. The storage 8 may include a storage device used as a temporary storage area such as a random access memory (RAM). The program stored in the storage 8 may include a program (not illustrated) which supports an operation of an application. The program, the application, and the data stored in the storage 8 may be acquired from other devices such as the facility server 100 through wireless or wired communication.

The control program 80 provides functions relating to various kinds of control of the head-mounted display 1. The functions provided by the control program 80 include the detection processor 80a, the display controller 80b, and a power controller 80c.

The detection processor 80a provides a function to execute various kinds of control of the head-mounted display 1 based on a detection result of the detector 5. The display controller 80b provides a function to execute display control of the displays 2a and 2b.

The power controller 80c provides a function to perform control so that when the cartridge 1000 is connected to the interface 10, power supply is received not from the power accumulator 11, but from a power accumulator 1001 included in the cartridge 1000. The power controller 80c provides a function to determine, when the cartridge 1000 is connected, whether a residual capacity of power accumulated in the power accumulator 1001 is less than or equal to a first predetermined amount, and to execute notification when it is determined to be less than or equal to the first predetermined amount. The power controller 80c can also provide a function to execute notification when the sum of a residual capacity of power accumulated in the power accumulator 11 and the residual capacity of the power accumulated in the power accumulator 1001 is less than or equal to a second predetermined amount. The first and second predetermined amounts fall under, for example, an amount of power required to complete execution of an application based on the data acquired from the cartridge 1000. The amount of power required for the execution of the application based on the data acquired from the cartridge 1000 corresponds, for example, to an amount of power required for the facility application 81 to execute a process using the cartridge data 83. The power accumulator 11 is an example of a first power accumulator, for example. The power accumulator 1001 is an example of a second power accumulator, for example.

The functions provided by the control program 80 include the following function in addition to the above functions. For example, the functions provided by the control program 80 include a function to detect connection of the cartridge 1000 to the interface 10.

The facility application 81 is, for example, an application which provides a function with which the user of the head-mounted display 1 uses installations and devices disposed in the facilities via the head-mounted display 1. For example, in a case of an amusement park, the facility application 81 falls under an application for displaying various kinds of information regarding the amusement park, for example, a map of the amusement park, or outputting a moving image, sound, and the like when the user enjoys various attractions arranged in the amusement park. The facility application 81 may be configured as an application set including applications respectively corresponding to installations and devices when there are pluralities of installations and devices disposed in the facilities. The facility application 81 may be acquired from the cartridge 1000 connected to the interface 10.

The control data 82 is data used for various kinds of control of the head-mounted display 1 executed by the functions provided by the control program 80. In some embodiments, the control data 82 includes data of a first predetermined amount and a second predetermined amount. The control data 82 includes data regarding notification executed when the residual capacity of the power accumulated in the power accumulator 1001 is less than or equal to the first predetermined amount, or when the sum of the residual capacity of the power accumulated in the power accumulator 11 and the residual capacity of the power accumulated in the power accumulator 1001 is less than or equal to the second predetermined amount. The control data 82 may be acquired from the cartridge 1000 connected to the interface 10.

The cartridge data 83 is data acquired from the cartridge 1000 connected to the interface 10. The cartridge data 83 includes facility application reference data or the like. The facility application reference data is used in a process executed by the facility application 81. For example, in a case of an amusement park, the facility application reference data is used in order for the facility application 81 to output content such as a moving image and sound to the head-mounted display 1 in accordance with a progression of a game in an attraction. When the facility application 81 is configured as an application set including applications respectively corresponding to installations and devices disposed in the facilities, the facility application reference data may be configured as a data set including data corresponding to each application.

The facility server data 84 is data provided from the facility server 100. For example, in a case of an amusement park, the facility server data 84 is used in order for the facility application 81 to cause the head-mounted display 1 to display various kinds of information regarding the amusement park other than information acquired from the cartridge 1000.

The controller 9 includes a processor. The processor may be configured to include, for example, a central processing unit (CPU), a system-on-a-chip (SoC), a micro control unit (MCU), a field-programmable gate array (FPGA), and a coprocessor, but there is no limitation to the case where the processor is configured to include the above devices. The controller 9 integrally controls operations of the head-mounted display 1 to realize various functions. Specifically, the controller 9 realizes various kinds of control of the head-mounted display 1 by executing a command included in the control program 80 stored in the storage 8 while referring to the control data 82 stored in the storage 8 if needed.

By executing the control program 80, the controller 9 realizes a process to perform control so that when the cartridge 1000 is connected to the interface 10, power supply is received from the power accumulator 1001 included in the cartridge 1000. By executing the control program 80, the controller 9 realizes a process to determine, when the cartridge 1000 is connected, whether the residual capacity of the power accumulated in the power accumulator 1001 is less than or equal to the first predetermined amount, and to perform notification when it is determined to be less than or equal to the first predetermined amount. By executing the control program 80, the controller 9 realizes a process to perform notification when the cartridge 1000 is connected and when the sum of the residual capacity of the power accumulated in the power accumulator 11 and the residual capacity of the power accumulated in the power accumulator 1001 is less than or equal to the second predetermined amount. The notification realized by the controller 9 includes, for example, putting the user of the head-mounted display 1 on notice that a residual capacity of power is less than that required for executing a process performed by the facility application 81. Such notice may be given in any method using, for example, sound, images, light, or vibration.

The interface 10 is open in such a manner that the cartridge 1000 can be connected thereto. When the cartridge 1000 is connected, the interface 10 outputs a connection detection signal to the controller 9. The connection detection signal is used for notifying the controller 9 that the cartridge 1000 has been connected. The interface 10 acquires, from the cartridge 1000, data stored in the cartridge 1000, and outputs the acquired data to the controller 9.

The power accumulator 11 accumulates power required for various processes executed in the head-mounted display 1. The power accumulator 11 is, for example, a secondary battery or a capacitor.

The cartridge 1000 includes the power accumulator 1001. The power accumulator 1001 accumulates power required for a process performed by the facility application 81 executed in the head-mounted display 1. The power accumulator 1001 is, for example, a primary battery, a secondary battery or a capacitor.

Figure 12:
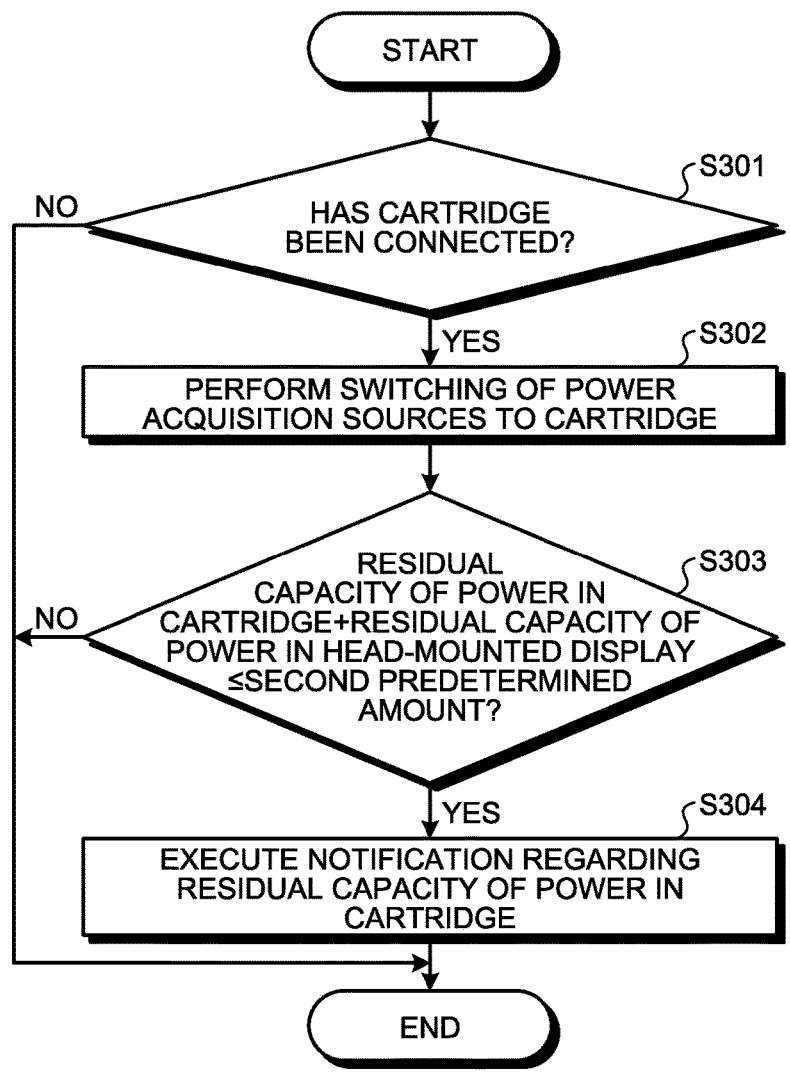
FIG. 12 is a flowchart illustrating an example of the process performed by the head-mounted display according to some embodiments.
Figure 13:
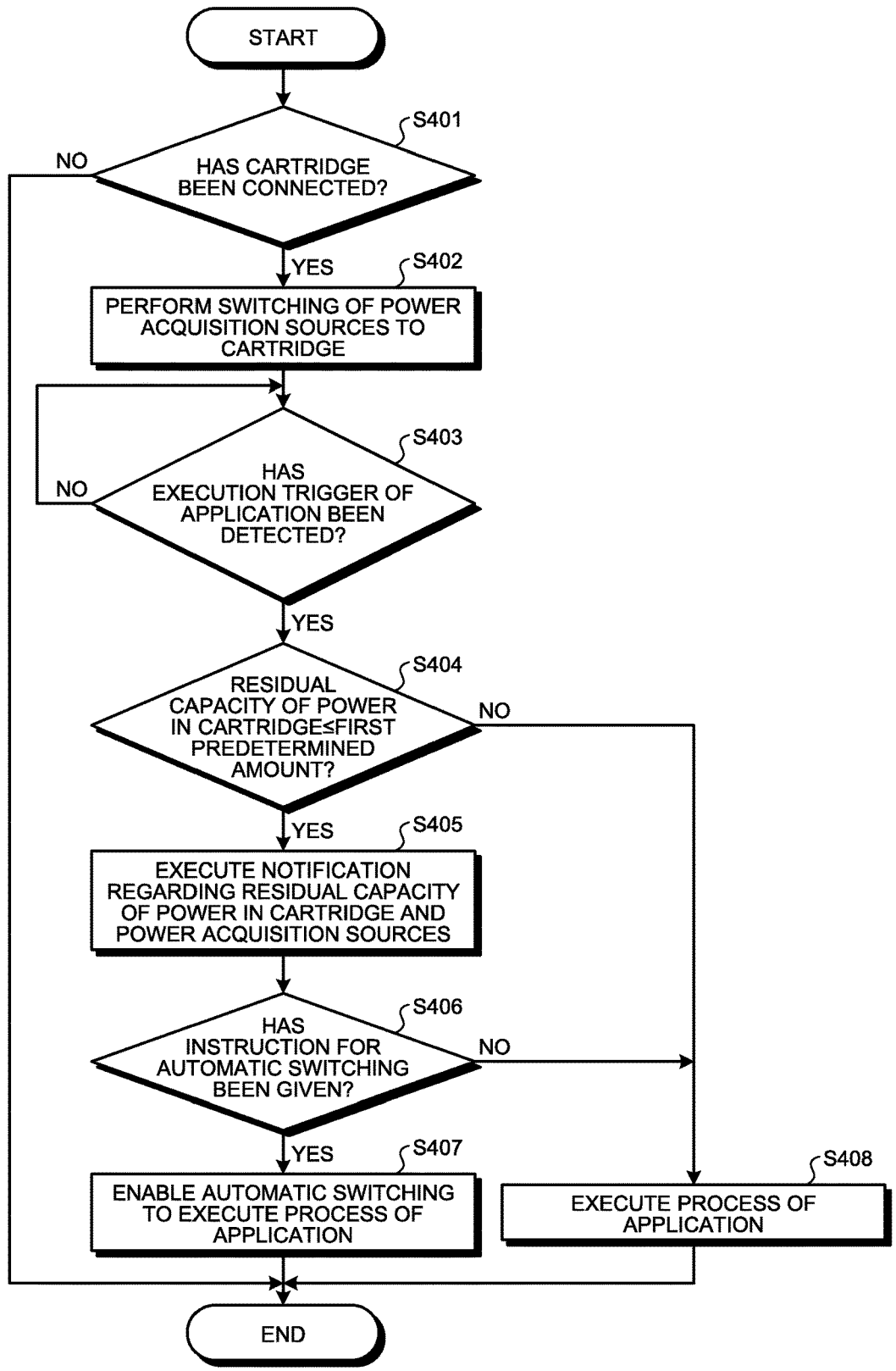
FIG. 13 is a flowchart illustrating an example of the process performed by the head-mounted display according to some embodiments.
Figure 14:
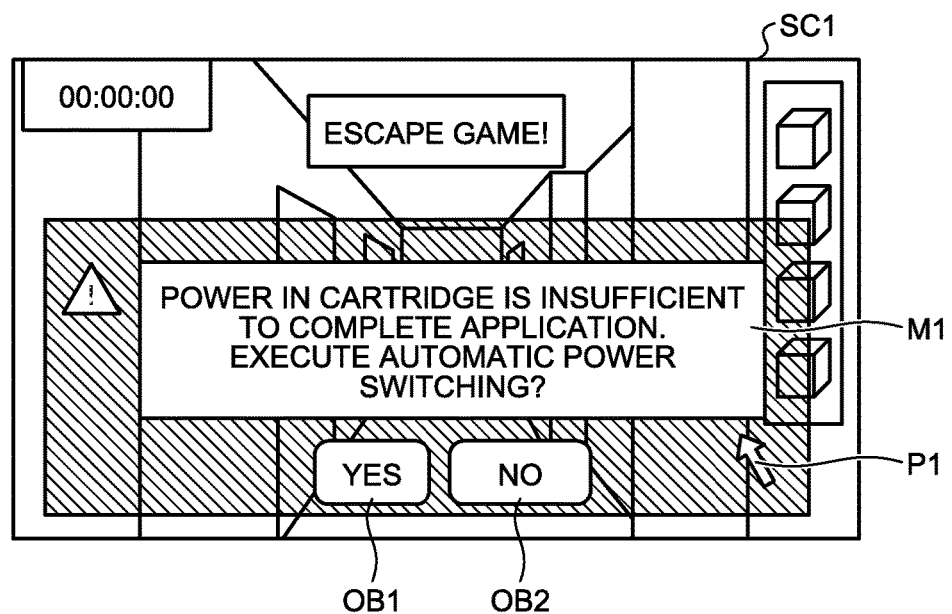
FIG. 14 is a view illustrating an example of notification performed by the head-mounted display according to some embodiments.

A flow of a process performed by the head-mounted display according to some embodiments will be described by using FIGS. 10 to 14. FIGS. 10 to 13 are flowcharts each illustrating an example of the process performed by the head-mounted display according to some embodiments. FIG. 14 is a view illustrating an example of notification performed by the head-mounted display according to some embodiments.

Figure 10:
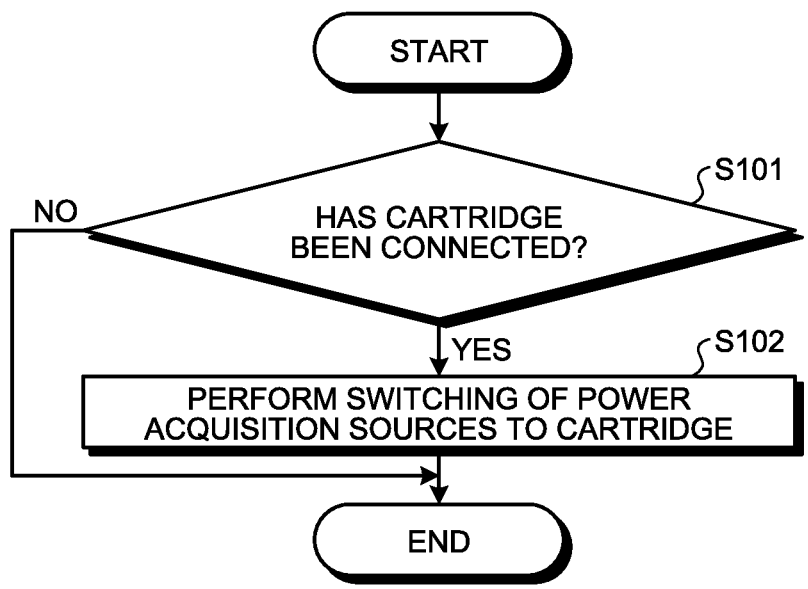
FIG. 10 is a flowchart illustrating an example of a process performed by the head-mounted display according to some embodiments.

An example of the process performed by the head-mounted display illustrated in FIG. 10 will be described. As illustrated in FIG. 10, the head-mounted display 1 determines whether connection of the cartridge 1000 has been detected (Step S101).

In a case where the connection of the cartridge 1000 has not been detected as a result of the determination (Step S101, No), the head-mounted display 1 terminates the process illustrated in FIG. 10.

On the other hand, in a case where the connection of the cartridge 1000 has been detected as a result of the determination (Step S101, Yes), the head-mounted display 1 performs switching of power acquisition sources to the cartridge 1000 (power accumulator 1001) (Step S102), and terminates the process illustrated in FIG. 10.

Figure 11:
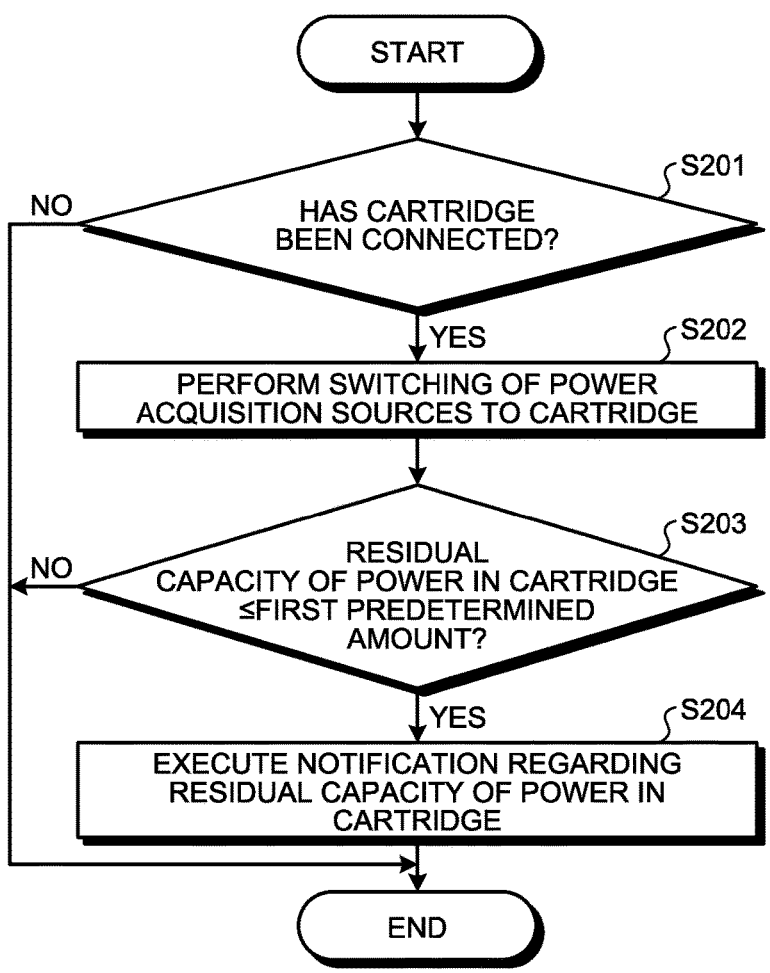
FIG. 11 is a flowchart illustrating an example of the process performed by the head-mounted display according to some embodiments.

An example of the process performed by the head-mounted display illustrated in FIG. 11 will be described. As illustrated in FIG. 11, the head-mounted display 1 determines whether connection of the cartridge 1000 has been detected (Step S201).

In a case where the connection of the cartridge 1000 has not been detected as a result of the determination (Step S201, No), the head-mounted display 1 terminates the process illustrated in FIG. 11.

On the other hand, in a case where the connection of the cartridge 1000 has been detected as a result of the determination (Step S201, Yes), the head-mounted display 1 performs switching of power acquisition sources to the cartridge 1000 (power accumulator 1001) (Step S202).

Subsequently, the head-mounted display 1 determines whether a residual capacity of power in the cartridge 1000 (power accumulator 1001) is less than or equal to the first predetermined amount (Step S203).

In a case where the residual capacity of the power in the cartridge 1000 (power accumulator 1001) is less than or equal to the first predetermined amount as a result of the determination (Step S203, Yes), the head-mounted display 1 executes notification regarding the residual capacity of the power in the cartridge 1000 (Step S204), and terminates the process illustrated in FIG. 11.

On the other hand, in a case where the residual capacity of the power in the cartridge 1000 (power accumulator 1001) is not less than or equal to the first predetermined amount as a result of the determination (Step S203, No), the head-mounted display 1 terminates the process illustrated in FIG. 11.

An example of the process performed by the head-mounted display illustrated in FIG. 12 will be described. As illustrated in FIG. 12, the head-mounted display 1 determines whether connection of the cartridge 1000 has been detected (Step S301).

In a case where the connection of the cartridge 1000 has not been detected as a result of the determination (Step S301, No), the head-mounted display 1 terminates the process illustrated in FIG. 12.

On the other hand, in a case where the connection of the cartridge 1000 has been detected as a result of the determination (Step S301, Yes), the head-mounted display 1 performs switching of power acquisition sources to the cartridge 1000 (power accumulator 1001) (Step S302).

Subsequently, the head-mounted display 1 determines whether the sum of a residual capacity of power in the cartridge 1000 (power accumulator 1001) and a residual capacity of power in the head-mounted display 1 (power accumulator 11) is less than or equal to the second predetermined amount (Step S303).

In a case where the sum of the residual capacity of the power in the cartridge 1000 (power accumulator 1001) and the residual capacity of the power in the head-mounted display 1 (power accumulator 11) is less than or equal to the second predetermined amount as a result of the determination (Step S303, Yes), the head-mounted display 1 executes notification regarding the residual capacity of the power in the cartridge 1000 (Step S304), and terminates the process illustrated in FIG. 12.

On the other hand, in a case where the sum of the residual capacity of the power in the cartridge 1000 (power accumulator 1001) and the residual capacity of the power in the head-mounted display 1 (power accumulator 11) is not less than or equal to the second predetermined amount as a result of the determination (Step S303, No), the head-mounted display 1 terminates the process illustrated in FIG. 12.

In FIG. 12, when power in the power accumulator 1001 included in the cartridge 1000 is used up, the head-mounted display 1 can automatically perform switching of the power acquisition sources to the power accumulator 11 from the power accumulator 1001 to use power in the power accumulator 11.

An example of the process performed by the head-mounted display illustrated in FIG. 13 will be described. As illustrated in FIG. 13, the head-mounted display 1 determines whether connection of the cartridge 1000 has been detected (Step S401).

In a case where the connection of the cartridge 1000 has not been detected as a result of the determination (Step S401, No), the head-mounted display 1 terminates the process illustrated in FIG. 13.

On the other hand, in a case where the connection of the cartridge 1000 has been detected as a result of the determination (Step S401, Yes), the head-mounted display 1 performs switching of power acquisition sources to the cartridge 1000 (power accumulator 1001) (Step S402).

Subsequently, the head-mounted display 1 determines whether an execution trigger of an application (for example, the facility application 81) has been detected (Step S403). As the execution trigger, for example, in a case of detecting a radio wave sent from a gate of an attraction arranged in an amusement park, an execution operation manually performed by the user of the head-mounted display 1 may be assumed.

In a case where the execution trigger of the application has not been detected as a result of the determination (Step S403, No), the head-mounted display 1 repeats the same determination.

On the other hand, in a case where the execution trigger of the application has been detected as a result of the determination (Step S403, Yes), the head-mounted display 1 determines whether a residual capacity of power in the cartridge 1000 (power accumulator 1001) is less than or equal to the first predetermined amount (Step S404).

In a case where the residual capacity of the power in the cartridge 1000 (power accumulator 1001) is less than or equal to the first predetermined amount as a result of the determination (Step S404, Yes), the head-mounted display 1 executes notification regarding the residual capacity of the power in the cartridge 1000 and the power acquisition sources (Step S405).

An example of the notification at Step S405 will be described by using FIG. 14. As illustrated in FIG. 14, the head-mounted display 1 displays an application execution screen SC1 on at least one of the displays 2*a* and 2*b*. On the application execution screen SC1, a message M1 is displayed. The message M1 is used for performing notification regarding the residual capacity of the power in the cartridge 1000 and the power acquisition sources. Furthermore, on the application execution screen SC1, buttons OB1 and OB2 are arranged. The buttons OB1 and OB2 are used in order for the user of the head-mounted display 1 to decide whether to execute automatic power switching. Furthermore, on the application execution screen SC1, a pointer P1 is displayed. The pointer P1 works with an operation executed via the operation unit 6. The head-mounted display 1 enables the automatic power switching in accordance with an operation with respect to the button OB1, while not enabling the automatic power switching when an operation is performed with respect to the button OB2. The automatic power switching falls under, for example, a process in which when power in the power accumulator 1001 included in the cartridge 1000 is used up, the head-mounted display 1 automatically performs switching of the power acquisition sources to the power accumulator 11 from the power accumulator 1001 to use power in the power accumulator 11.

The head-mounted display 1 determines whether an instruction for automatic power switching has been given (Step S406). The head-mounted display 1 determines, for example, when the operation is performed with respect to the button OB1 arranged in the application execution screen SC1 illustrated in FIG. 14, that the instruction for automatic power switching has been given from the user of the head-mounted display 1. On the other hand, the head-mounted display 1 determines, for example, when the operation is performed with respect to the button OB2 arranged in the application execution screen SC1 illustrated in FIG. 14, that the instruction for automatic power switching has not been given from the user of the head-mounted display 1.

In a case where the instruction for automatic power switching has been given as a result of the determination (Step S406, Yes), the head-mounted display 1 enables the automatic switching to execute the process of the application (Step S407), and terminates the process in FIG. 13.

On the other hand, in a case where the instruction for automatic power switching has not been given as a result of the determination (Step S406, No), the head-mounted display 1 executes the process of the application without enabling the automatic switching (Step S408), and terminates the process in FIG. 13.

At Step S404 above, in a case where the residual capacity of the power in the cartridge 1000 (power accumulator 1001) is not less than or equal to the first predetermined amount as a result of the determination (Step S404, No), the head-mounted display 1 moves to Step S408 above.

In some embodiments above, the head-mounted display 1 performs control so that when the cartridge 1000 is connected to the interface 10, power supply is received not from the power accumulator 11, but from the power accumulator 1001 included in the cartridge 1000. Consequently, the user of the head-mounted display 1 does not need to use power in the head-mounted display 1 when receiving various services via the head-mounted display 1 to which the cartridge 1000 is connected, and therefore, it is possible to improve usability of the head-mounted display 1 when using facilities which provide the cartridge 1000.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-mounted display, comprising:
    a first power accumulator that supplies power to the head-mounted display;
    an interface capable of connecting a cartridge thereto; and
    a controller that performs control so that when the cartridge is connected to the interface, power supply is received not from the first power accumulator, but from a second power accumulator included in the cartridge, wherein the controller determines, when the cartridge is connected, whether a residual capacity of power accumulated in the second power accumulator is less than or equal to a first predetermined amount, and executes notification when it is determined to be less than or equal to the first predetermined amount.

2. The head-mounted display according to claim 1, wherein the first predetermined amount is an amount of power required to complete execution of an application based on data acquired from the cartridge.

3. The head-mounted display according to claim 1, wherein the controller executes notification when it is determined that the sum of a residual capacity of power accumulated in the first power accumulator and a residual capacity of power accumulated in the second power accumulator is less than or equal to a second predetermined amount.

4. The head-mounted display according to claim 3, wherein the second predetermined amount is an amount of power required to complete execution of an application based on data acquired from the cartridge.

* * * * *